US012704439B2

(12) United States Patent
Yang et al.

(10) Patent No.: US 12,704,439 B2
(45) Date of Patent: Aug. 11, 2026

(54) METHOD FOR DETERMINING REGULATION RANGE OF PUMPING POWER OF THREE-MACHINE PUMPED STORAGE UNIT

(71) Applicant: CHINA THREE GORGES CORPORATION, Wuhan City (CN)

(72) Inventors: Jing Yang, Wuhan City (CN); Zubing Zou, Wuhan City (CN); Xiquan Liu, Wuhan City (CN); Yong Sun, Wuhan City (CN); Zhe Ma, Wuhan City (CN); Peng Li, Wuhan City (CN); Yuan Gao, Wuhan City (CN)

(73) Assignee: CHINA THREE GORGES CORPORATION (CN)

( * ) Notice: Subject to any disclaimer, the term of this patent is extended or adjusted under 35 U.S.C. 154(b) by 407 days.

(21) Appl. No.: 18/489,845

(22) Filed: Oct. 19, 2023

(65) Prior Publication Data

US 2024/0142348 A1 May 2, 2024

(30) Foreign Application Priority Data

Nov. 1, 2022 (CN) ........................ 202211356306.1

(51) Int. Cl.
*G01M 99/00* (2011.01)
*F01D 15/08* (2006.01)
*F01D 15/10* (2006.01)

(52) U.S. Cl.
CPC .......... *G01M 99/008* (2013.01); *F01D 15/08* (2013.01); *F01D 15/10* (2013.01)

(58) Field of Classification Search
CPC ...... F01D 15/08; F01D 15/10; G01M 99/008; Y02E 60/16; Y02E 10/20
USPC ........................................................ 702/182
See application file for complete search history.

(56) References Cited

PUBLICATIONS

Xie, CN 114001270 A, "Water-gas Heat Comprehensive Energy Storage System and Method", Date Published: Feb. 1, 2022 (Year: 2022).*

* cited by examiner

*Primary Examiner* — John H Le

(57) ABSTRACT

A method for determining a regulation range of pumping power of a three-machine pumped storage unit is provided. The method includes: obtaining a first parameter set of pumping measurement parameters for characterizing the three-machine pumped storage unit and determining a pumping process efficiency; determining a first relational expression based on the pumping process efficiency and a design efficiency of a pumped storage power station and establishing a second relational expression; and determining a third relational expression based on power absorbed by a power grid and the second relational expression and determining a fourth relational expression, where the fourth relational expression reflects the regulation range of the pumping power of the three-machine pumped storage unit. The method for determining the regulation range of the pumping power of the three-machine pumped storage unit is proposed according to unit characteristics and operating economy of the power station.

8 Claims, 5 Drawing Sheets

METHOD FOR DETERMINING REGULATION RANGE OF PUMPING POWER OF THREE-MACHINE PUMPED STORAGE UNIT

CROSS-REFERENCE TO RELATED APPLICATIONS

This application claims priority to Chinese Application No. 202211356306.1, having a filing date of Nov. 1, 2022, the entire contents of which are hereby incorporated by reference.

FIELD

The present disclosure relates to the technical field of pumped storage, and specifically to a method for determining a regulation range of pumping power of a three-machine pumped storage unit.

BACKGROUND

Pumped storage power stations are important flexibly regulated power supplies in a power grid. A mixed flow reversible unit including a bidirectional pump turbine and a generator motor is often used. The mixed flow reversible pumped storage unit is the most widely used and has a working head of 30-800 m. However, the development of mixed flow units is extremely difficult at sites with higher water heads and energy densities. Moreover, the conventional mixed flow reversible unit cannot be regulated in its power when operating as a water pump for pumping water, which restricts the role of a pumped storage power station in consumption of renewable energy in a novel power system.

The pumping power of the water pump after grid connection of a three-machine unit may be flexibly regulated according to a requirement of the power grid. During the process, the power of the water pump remains constant. By regulating the opening degree and power of a hydraulic turbine in real time, the operating power of the water pump is distributed between the power grid and the hydraulic turbine, thereby fully utilizing excess power of the power grid that is less than the power of one pump. However, there is no research on determining a regulation range of the pumping power of the three-machine unit, which is unfavorable for the three-machine unit to fully exert its flexible regulation function to serve the power grid.

SUMMARY

In view of this, an embodiment of the present disclosure provides a method for determining a regulation range of pumping power of a three-machine pumped storage unit, to solve the technical problem of poor function of flexible operation of the three-machine pumped storage unit due to the fact that a function of hydraulic circuit operation cannot be used to regulate the pumping power of the three-machine pumped storage unit in the prior art.

The technical solution proposed by the present disclosure is as follows:

In a first aspect, an embodiment of the present disclosure provides a method for determining a regulation range of pumping power of a three-machine pumped storage unit. The three-machine pumped storage unit includes a generator, a water pump, and a hydraulic turbine, where a main shaft of the generator has one end connected to the water pump and the other end connected to the hydraulic turbine. The method for determining a regulation range of pumping power of a three-machine pumped storage unit includes: obtaining a first parameter set of pumping measurement parameters for characterizing the three-machine pumped storage unit, where the first parameter set includes a gravitational acceleration, a water head, an inflow, power absorbed by a power grid, and a design efficiency of a pumped storage power station; determining a pumping process efficiency based on the gravitational acceleration, the water head, the inflow, and the power absorbed by the power grid, where the pumping process efficiency is obtained when the generator, the water pump, and the hydraulic turbine in the three-machine pumped storage unit operate simultaneously; determining a first relational expression based on the pumping process efficiency and the design efficiency of the pumped storage power station, where the first relational expression reflects a relationship between the pumping process efficiency and the design efficiency of the pumped storage power station; establishing a second relational expression based on the first relational expression, where the second relational expression characterizes power of the hydraulic turbine; determining a third relational expression based on the power absorbed by the power grid and the second relational expression, where the third relational expression reflects a first regulation range of the power absorbed by the power grid during pumping by the three-machine pumped storage unit; and determining a fourth relational expression based on the third relational expression, where the fourth relational expression reflects the regulation range of the pumping power of the three-machine pumped storage unit.

In combination with the first aspect, in a possible implementation of the first aspect, obtaining power absorbed by a power grid in the first parameter set includes: obtaining power of the water pump and the power of the hydraulic turbine; and calculating the power absorbed by the power grid based on the power of the water pump and the power of the hydraulic turbine.

In combination with the first aspect, in another possible implementation of the first aspect, obtaining an inflow in the first parameter set includes: obtaining a weighted average efficiency of the water pump and a weighted average efficiency of the hydraulic turbine; calculating a flow of the water pump based on the power of the water pump, the weighted average efficiency of the water pump, the gravitational acceleration, and the water head; calculating a flow of the hydraulic turbine based on the power of the hydraulic turbine, the weighted average efficiency of the hydraulic turbine, the gravitational acceleration, and the water head; and calculating the inflow based on the flow of the water pump and the flow of the hydraulic turbine.

In combination with the first aspect, in yet another possible implementation of the first aspect, determining a first relational expression based on the pumping process efficiency and the design efficiency of the pumped storage power station includes: determining the first relational expression based on the gravitational acceleration, the water head, the power of the water pump, the weighted average efficiency of the water pump, the power of the hydraulic turbine, the weighted average efficiency of the hydraulic turbine, and the design efficiency of the pumped storage power station.

In combination with the first aspect, in yet another possible implementation of the first aspect, establishing a second relational expression based on the first relational expression includes: transforming the first relational expression in the yet another implementation of this embodiment of the present disclosure to obtain the second relational expression, where the second relational expression is determined based on the power of the water pump, the weighted average efficiency of the water pump, the weighted average efficiency of the hydraulic turbine, and the design efficiency of the pumped storage power station.

In combination with the first aspect, in yet another possible implementation of the first aspect, determining a third relational expression based on the power absorbed by the power grid and the second relational expression includes: determining the third relational expression based on the power of the water pump, the weighted average efficiency of the water pump, the weighted average efficiency of the hydraulic turbine, and the design efficiency of the pumped storage power station.

In combination with the first aspect, in yet another possible implementation of the first aspect, determining a fourth relational expression based on the third relational expression includes: determining a fifth relational expression based on the power absorbed by the power grid, where the fifth relational expression reflects a second regulation range of the power absorbed by the power grid; and determining the fourth relational expression based on the fifth relational expression and the third relational expression.

In a second aspect, an embodiment of the present disclosure provides a three-machine pumped storage unit configured to perform the method for determining a regulation range of pumping power of a three-machine pumped storage unit according to the first aspect of the embodiment of the present disclosure and any one of methods in the first aspect. The three-machine pumped storage unit is arranged in a horizontal manner and includes a generator, a water pump, and an impulse turbine, where a main shaft of the generator has one end connected to the water pump and the other end connected to the impulse turbine.

In a third aspect, an embodiment of the present disclosure provides an apparatus for determining a regulation range of pumping power of a three-machine pumped storage unit. The three-machine pumped storage unit includes a generator, a water pump, and a hydraulic turbine, where a main shaft of the generator has one end connected to the water pump and the other end connected to the hydraulic turbine. The apparatus for determining a regulation range of pumping power of a three-machine pumped storage unit includes: an obtaining module configured to obtain a first parameter set of pumping measurement parameters for characterizing the three-machine pumped storage unit, where the first parameter set includes a gravitational acceleration, a water head, an inflow, power absorbed by a power grid, and a design efficiency of a pumped storage power station; a first determination module configured to determine a pumping process efficiency based on the gravitational acceleration, the water head, the inflow, and the power absorbed by the power grid, where the pumping process efficiency is obtained when the generator, the water pump, and the hydraulic turbine in the three-machine pumped storage unit operate simultaneously, a second determination module configured to determine a first relational expression based on the pumping process efficiency and the design efficiency of the pumped storage power station, where the first relational expression reflects a relationship between the pumping process efficiency and the design efficiency of the pumped storage power station; an establishment module configured to establish a second relational expression based on the first relational expression, where the second relational expression characterizes power of the hydraulic turbine; a third determination module configured to determine a third relational expression based on the power absorbed by the power grid and the second relational expression, where the third relational expression reflects a first regulation range of the power absorbed by the power grid during pumping by the three-machine pumped storage unit; and a fourth determination module configured to determine a fourth relational expression based on the third relational expression, where the fourth relational expression reflects the regulation range of the pumping power of the three-machine pumped storage unit.

In a fourth aspect, an embodiment of the present disclosure provides an electronic device, including a memory and a processor in communication connection with each other, where the memory stores a computer instruction, and the processor executes the computer instruction to perform the method for determining a regulation range of pumping power according to the first aspect of the embodiment of the present disclosure and any one of methods in the first aspect.

In a fifth aspect, an embodiment of the present disclosure provides a computer-readable storage medium storing a computer instruction used to cause a computer to perform the method for determining a regulation range of pumping power according to the first aspect of the embodiment of the present disclosure and any one of methods in the first aspect.

The technical solution provided by the present disclosure has the following effects:

According to the method for determining a regulation range of pumping power of a three-machine pumped storage unit provided by the embodiment of the present disclosure, the three-machine pumped storage unit includes the generator, the water pump, and the hydraulic turbine, where the main shaft of the generator has one end connected to the water pump and the other end connected to the hydraulic turbine. The method for determining the regulation range of the pumping power of the three-machine pumped storage unit is proposed according to unit characteristics and operating economy of the power station, such that the implementation of pumping hydraulic short circuit operation is taken into account in advance in a design stage, the problem that the pumping power cannot be regulated is solved, the capability of the pumped storage power station to be flexibly regulated to serve the power grid is enhanced, and a basis is provided for regulating the pumping power of the three-machine pumped storage unit during hydraulic circuit operation.

According to the three-machine pumped storage unit provided by the embodiment of the present disclosure, the applied water head of the pumped storage unit is increased using the impulse turbine, a shaft system of the three-machine pumped storage unit is simplified in structure, and the speed of mounting and aligning the shaft system of the power station is increased; the problem with the stability of the shaft system of the existing power station is solved; and the use of the three-machine pumped storage unit arranged in the horizontal manner reduces the amount of longitudinal excavation of a powerhouse and the construction cost of the power station.

BRIEF DESCRIPTION OF THE DRAWINGS

To describe the technical solutions in the embodiments of the present disclosure or in the prior art more clearly, the following briefly introduces the drawings required for describing the embodiments or the prior art. Apparently, the drawings in the following description show some embodiments of the present disclosure, other drawings can also be obtained according to these drawings without creative efforts.

DETAILED DESCRIPTION

To make the objectives, technical solutions and advantages of the embodiments of the present disclosure clearer, the technical solutions in the embodiments of the present disclosure will be clearly and completely described below in conjunction with the accompanying drawings in the embodiments of the present disclosure. Apparently, the described embodiments are some rather than all of the embodiments of the present disclosure. All other embodiments obtained by those skilled in the art based on the embodiments of the present disclosure without creative efforts shall fall within the scope of protection of the present disclosure.

An embodiment of the present disclosure provides a method for determining a regulation range of pumping power of a three-machine pumped storage unit, where the three-machine pumped storage unit includes a generator, a water pump, and a hydraulic turbine, and a main shaft of the generator has one end connected to the water pump and the other end connected to the hydraulic turbine.

The three-machine pumped storage unit has three normal operating states including a state in which the hydraulic turbine operates alone to generate power, a state in which the water pump operates alone to pump water, and a state in which the water pump, the hydraulic turbine, and the generator operate simultaneously.

The state in which the water pump, the hydraulic turbine, and the generator operate simultaneously further includes three modes including a mode of normal start under a pumping condition, a mode of normal stop under the pumping condition, and a mode of power regulation under the pumping condition.

The three-machine pumped storage unit operates in a hydraulic circuit mode when the power needs to be regulated during pumping operation. A specific way is as follows: the water pump and the hydraulic turbine operate simultaneously, and all ball valves at an upstream part of the water pump are opened. The ball valves of the hydraulic turbine are opened to a certain degree according to a power requirement, such that output power of power generation and the pumping power of the water pump may be regulated within an allowable operating range, and thus the pumping power of the entire three-machine pumped storage unit may be regulated within a certain range.

Figure 1:
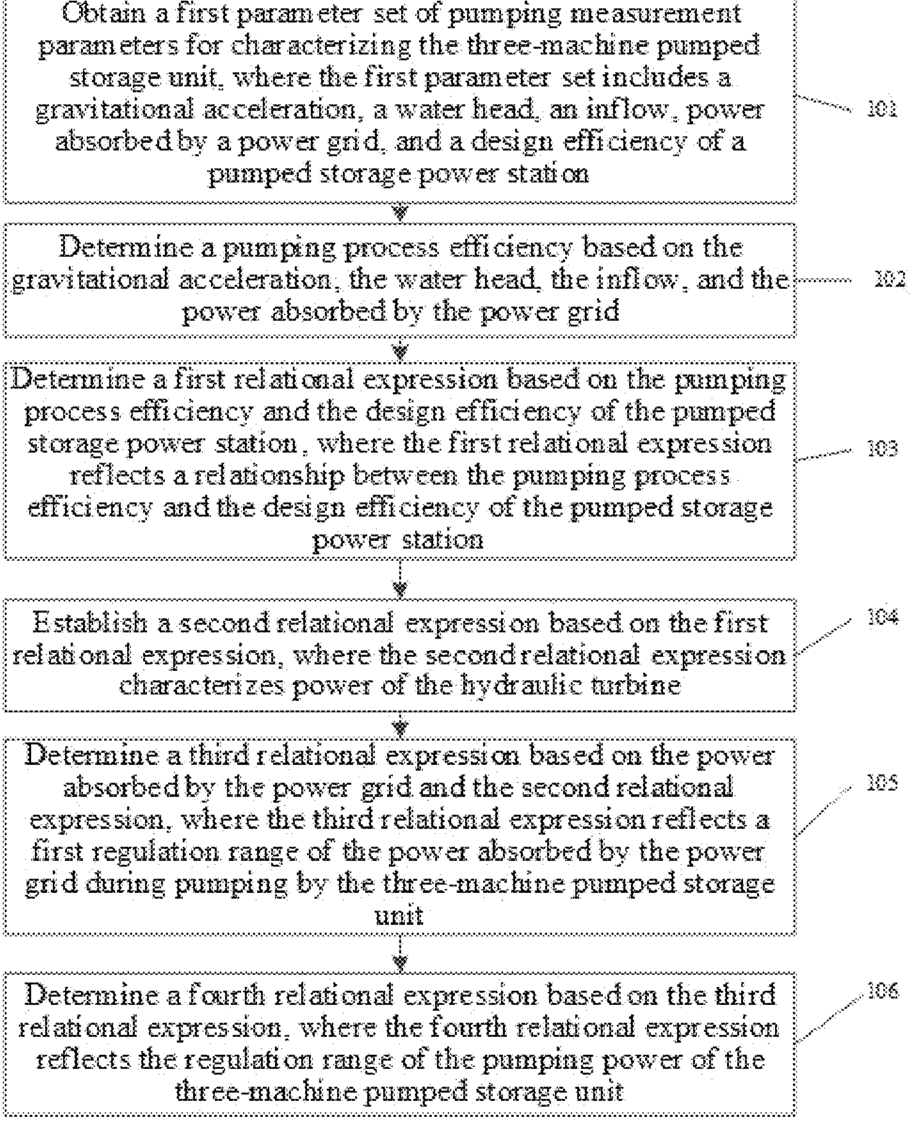
FIG. 1 is a flowchart of a method for determining a regulation range of pumping power of a three-machine pumped storage unit provided according to an embodiment of the present disclosure.

Specifically, as shown in FIG. 1, the method for determining a regulation range of pumping power includes the following steps.

In step 101, a first parameter set of pumping measurement parameters for characterizing the three-machine pumped storage unit is obtained.

The first parameter set includes a gravitational acceleration, a water head, an inflow, power absorbed by a power grid, and a design efficiency of a pumped storage power station.

In step 102, a pumping process efficiency is determined based on the gravitational acceleration, the water head, the inflow, and the power absorbed by the power grid.

The pumping process efficiency represents a pumping efficiency when the generator, the water pump, and the hydraulic turbine in the three-machine pumped storage unit operate simultaneously.

Specifically, the pumping process efficiency is calculated using the following relational expression (1):

$$\eta_{pumping\ process\ efficiency} = gHQ_{inflow}/P_m \tag{1}$$

where $\eta_{pumping\ process\ efficiency}$ represents the pumping process efficiency; g represents the gravitational acceleration; H represents the water head; $Q_{inflow}$ represents the inflow; and $P_m$ represents the power absorbed by the power grid.

In step 103, a first relational expression is determined based on the pumping process efficiency and the design efficiency of the pumped storage power station.

The first relational expression reflects a relationship between the pumping process efficiency and the design efficiency of the pumped storage power station, as shown in the following relational expression (2):

$$\eta_{pumping\ process\ efficiency} \geq \eta_{power\ station} \tag{2}$$

where $\eta_{power\ station}$ represents the design efficiency of the pumped storage power station.

In step 104, a second relational expression is established based on the first relational expression.

The second relational expression characterizes power of the hydraulic turbine.

In step 105, a third relational expression is determined based on the power absorbed by the power grid and the second relational expression.

The third relational expression reflects a first regulation range of the power absorbed by the power grid during pumping by the horizontal type three-machine pumped storage unit.

In step 106, a fourth relational expression is determined based on the third relational expression.

The fourth relational expression reflects the final regulation range of the pumping power of the three-machine pumped storage unit.

Specifically, the final regulation range of the pumping power of the three-machine pumped storage unit may be obtained in combination with an actual range of the power absorbed by the power grid based on the first regulation range of the power absorbed by the power grid.

According to the method for determining a regulation range of pumping power of a three-machine pumped storage unit provided by the embodiment of the present disclosure, the three-machine pumped storage unit includes the generator, the water pump, and the hydraulic turbine, where the main shaft of the generator has one end connected to the water pump and the other end connected to the hydraulic turbine. The method for determining the regulation range of the pumping power of the three-machine pumped storage unit is proposed according to unit characteristics and operating economy of the power station, such that the implementation of pumping hydraulic short circuit operation is taken into account in advance in a design stage, the problem that the pumping power cannot be regulated is solved, the capability of the pumped storage power station to be flexibly regulated to serve the power grid is enhanced, and a basis is provided for regulating the pumping power of the three-machine pumped storage unit during hydraulic circuit operation.

As an optional implementation of the embodiment of the present disclosure, obtaining power absorbed by a power grid in the first parameter set includes: obtaining power of the water pump and the power of the hydraulic turbine; and calculating the power absorbed by the power grid based on the power of the water pump and the power of the hydraulic turbine.

Specifically, the power absorbed by the power grid is calculated using the following relational expression (3):

$$P_m = P_P - P_t \tag{3}$$

where $P_P$ represents the power of the water pump; and $P_t$ represents the power of the hydraulic turbine.

As an optional implementation of the embodiment of the present disclosure, obtaining an inflow in the first parameter set includes: obtaining a weighted average efficiency of the water pump and a weighted average efficiency of the hydraulic turbine; calculating a flow of the water pump based on the power of the water pump, the weighted average efficiency of the water pump, the gravitational acceleration, and the water head; calculating a flow of the hydraulic turbine based on the power of the hydraulic turbine, the weighted average efficiency of the hydraulic turbine, the gravitational acceleration, and the water head, and calculating the inflow based on the flow of the water pump and the flow of the hydraulic turbine.

Specifically, the flow of the water pump is calculated using the following relational expression (4):

$$Q_p = P_p \eta_p / gH \tag{4}$$

where $Q_p$ represents the flow of the water pump; and $\eta_p$ represents the weighted average efficiency of the water pump;

the flow of the hydraulic turbine is calculated using the following relational expression (5):

$$Q_t = P_t / (gH\eta_t) \tag{5}$$

where $Q_t$ represents the flow of the hydraulic turbine; and $\eta_t$ represents the weighted average efficiency of the hydraulic turbine.

Further, the flow of the hydraulic turbine is subtracted from the flow of the water pump to obtain the inflow, as shown in the following relational expression (6):

$$Q_{inflow} = Q_P - Q_t \tag{6}$$

As an optional implementation of the embodiment of the present disclosure, step 103 includes: determining the first relational expression based on the gravitational acceleration, the water head, the power of the water pump, the weighted average efficiency of the water pump, the power of the hydraulic turbine, the weighted average efficiency of the hydraulic turbine, and the design efficiency of the pumped storage power station.

Specifically, the relational expressions (3), (4), and (5) are substituted into the relational expressions (1) and (2) to obtain the corresponding first relational expression, as shown in the following relational expression (7):

$$gH\left(P_p\eta_p/gH - P_t/(gH\eta_t)\right)/(P_P - P_t) \geq \eta_{power\ station} \tag{7}$$

As an optional implementation of the embodiment of the present disclosure, step 104 includes: transforming the first relational expression in step 103 to obtain the second relational expression.

The second relational expression is determined based on the power $P_P$ of the water pump, the weighted average efficiency $\eta_p$ of the water pump, the weighted average efficiency $\eta_t$ of the hydraulic turbine, and the design efficiency $\eta_{power\ station}$ of the pumped storage power station.

Specifically, an inequality about the power of the hydraulic turbine, i.e., the second relationship is derived and established based on the relational expression (7), as shown in the following relational expression (8):

$$P_t \leq (P_p\eta_p - AP_p)/\left(1/\eta_t - \eta_{power\ station}\right) \tag{8}$$

As an optional implementation of the embodiment of the present disclosure, step 105 includes: determining the third relational expression based on the power of the water pump, the weighted average efficiency of the water pump, the weighted average efficiency of the hydraulic turbine, and the design efficiency of the pumped storage power station.

Specifically, the first regulation range of the power $P_m$ absorbed by the power grid during pumping by the three-machine pumped storage unit, i.e., the third relational expression may be obtained according to the relational expression (3) and the relational expression (8), as shown in the following relational expression (9):

$$P_m \geq P_p - P_p\eta_p - \eta_{power\ station}P_p)/\left(1/\eta_t - \eta_{power\ station}\right) \tag{9}$$

As an optional implementation of the embodiment of the present disclosure, step 106 includes: determining a fifth relational expression based on the power absorbed by the power grid, where the fifth relational expression reflects a second regulation range of the power absorbed by the power grid; and determining the fourth relational expression based on the fifth relational expression and the third relational expression.

Specifically, the range of the power $P_m$ absorbed by the power grid, i.e., the fifth relational expression may be obtained according to an operational requirement of the three-machine pumped storage unit, as shown in the following relational expression (10):

$$0 \le P_m \le P_p \quad (10)$$

Further, the regulation range of the pumping power of the three-machine pumped storage unit, i.e., the fourth relational expression may be obtained according to the relational expression (10) and the relational expression (9), as shown in the following relational expression (11):

$$P_p - (P_p\eta_p - \eta_{power\ station}P_p)/(1/\eta_t - \eta_{power\ station}) \le P_m \le P_p \quad (11)$$

The method for determining the regulation range of the pumping power of the three-machine pumped storage unit is proposed in this embodiment of the present disclosure, such that the implementation of pumping hydraulic short circuit operation may be taken into account in advance in the design stage, the problem that the pumping power cannot be regulated is solved, and the capability of the pumped storage power station to be flexibly regulated to serve the power grid is enhanced.

In an example, it is assumed that the power of the water pump is $P_p$=20 MW, the weighted average efficiency of the hydraulic turbine is $\eta_t$=92%, and the weighted average efficiency of the water pump is $\eta_p$=85%. In order to fully exert the regulation capability of the power station, it is assumed that the pumping design efficiency $\eta_{power\ station}$ of the power station is not less than 70%, the power regulation range for the pumping process of the three-machine power station may be calculated: 12.25 MW≤$P_m$≤20 MW.

A conventional three-machine pumped storage unit (such as a Yangzhuoyong lake pumped storage power station) is arranged in a vertical manner, and has a complex unit structure, poor operational stability, great difficulty in axis control during mounting, and large investment in mechanical equipment and civil construction.

An embodiment of the present disclosure further provides a three-machine pumped storage unit configured to perform the method for determining a regulation range of pumping power of a three-machine pumped storage unit according to the embodiment of the present disclosure. The three-machine pumped storage unit is arranged in a horizontal manner and includes a generator, a water pump, and an impulse turbine, where a main shaft of the generator has one end connected to the water pump and the other end connected to the impulse turbine.

Figure 2:
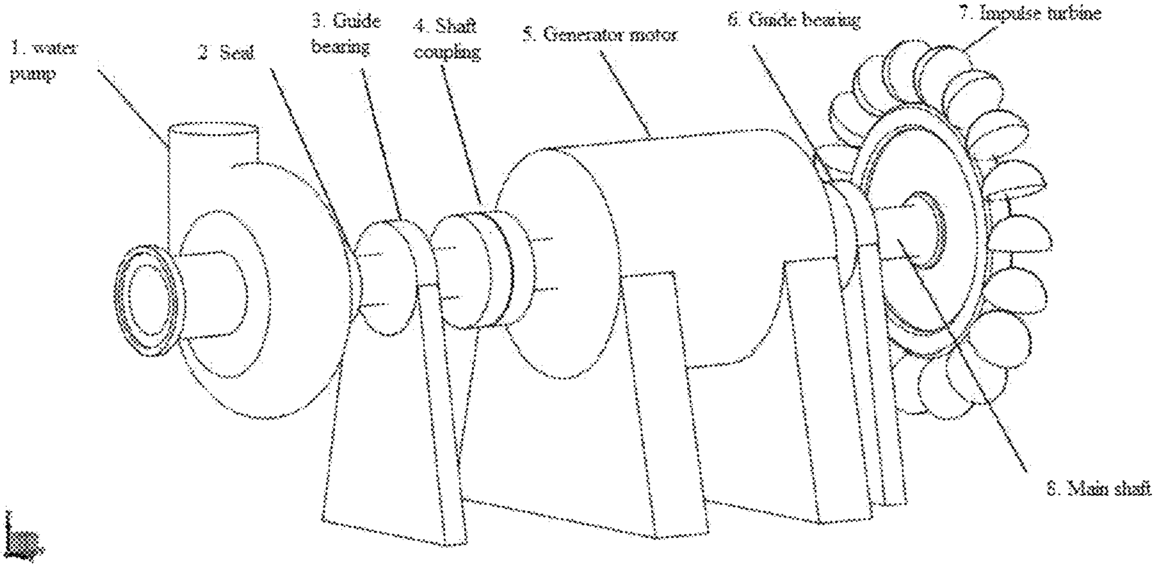
FIG. 2 is a block diagram of a structure of a horizontal type three-machine pumped storage unit provided according to an embodiment of the present disclosure.

Specifically, as shown in FIG. 2, the apparatus includes the generator 5, the water pump 1, and the impulse turbine 7. The main shaft 8 of the generator 5 has one end connected to the water pump 1 and the other end connected to the impulse turbine 7.

Further, the main shaft of the generator is further provided with a seal 2, a shaft coupling 4, a guide bearing 3, and a guide bearing 6.

The water pump 1 may be of various types such as a single-stage type, a multi-stage type, or a double-suction type according to lifts. The impulse turbine 7 may be a Pelton type impulse turbine operating at a water head of over 800 in, and one, two, three, or six nozzles may be chosen to be used according to an actual requirement.

Figure 3:
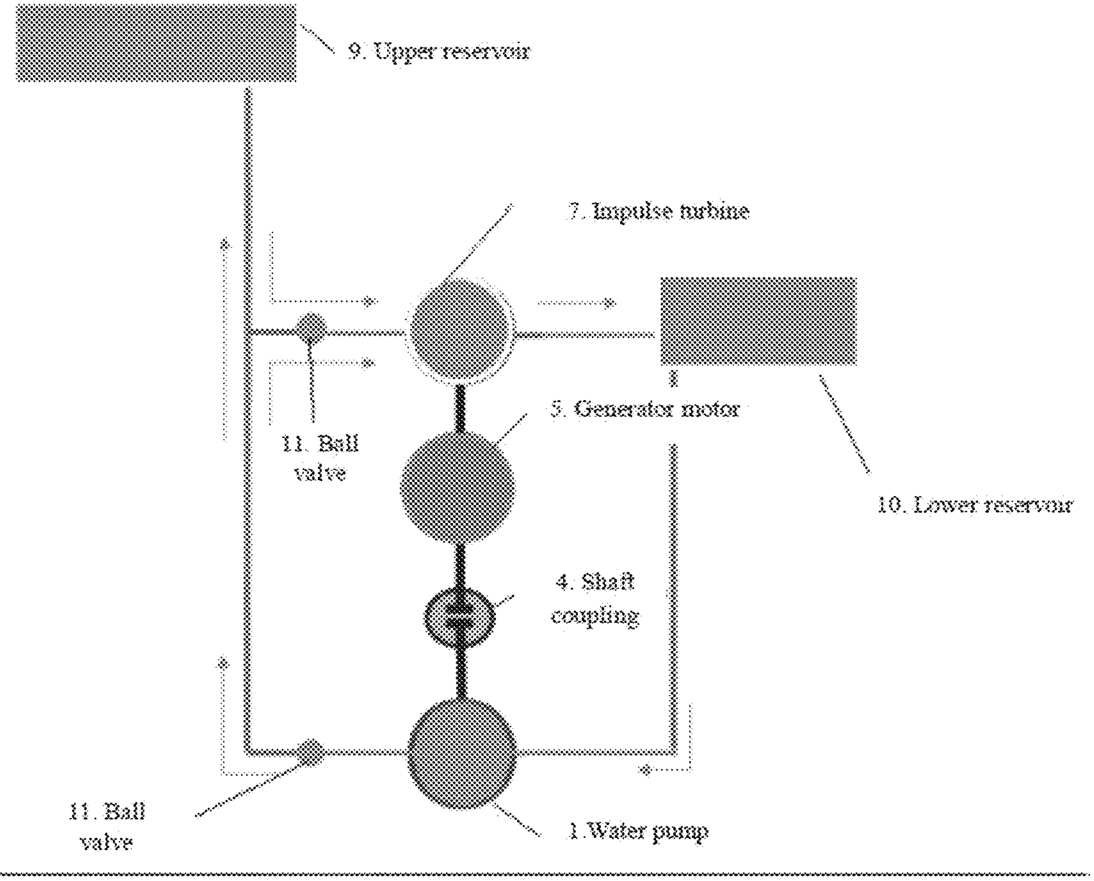
FIG. 3 is a schematic diagram of water flow movement during hydraulic circuit operation of a horizontal type three-machine pumped storage unit using an impulse turbine provided according to an embodiment of the present disclosure.

Further, as shown in FIG. 3, a pipeline system of the horizontal type three-machine pumped storage unit may have different control ball valves (11 and 12) and penstocks for the impulse turbine and the water pump in a unit section to control the flow of the hydraulic turbine or the water pump, and then the penstocks are merged into a common penstock at upstream and downstream parts. The downstream part of the water pump flows into a return water tank of the impulse turbine through a pipeline, which may effectively implement the hydraulic circuit operation.

The three-machine pumped storage unit uses the impulse turbine 7, which may adapt to a water head of 800-2,000 m and meet usage requirements of a high-water head pumped storage unit; and the applied water head of the pumped storage unit is increased. A shaft system of the three-machine pumped storage unit is simplified in structure, and the speed of mounting and aligning the shaft system of the power station is increased. The problem with the stability of the shaft system of the existing power station is solved.

Further, the use of the three-machine pumped storage unit arranged in the horizontal manner reduces the amount of longitudinal excavation of a powerhouse and the construction cost of the power station, greatly reduces the engineering investment amount for a ground or semi-underground powerhouse, and achieves the better economy and stability.

Figure 4:
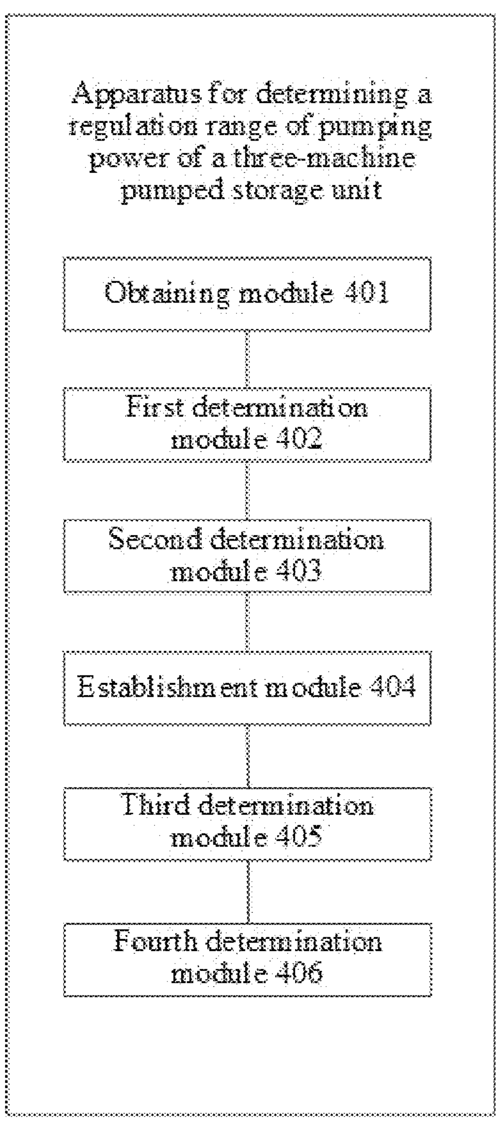
FIG. 4 is a block diagram of a structure of an apparatus for determining a regulation range of pumping power of a three-machine pumped storage unit provided according to an embodiment of the present disclosure.

An embodiment of the present disclosure further provides an apparatus for determining a regulation range of pumping power of a three-machine pumped storage unit. The three-machine pumped storage unit includes a generator, a water pump, and a hydraulic turbine, where a main shaft of the generator has one end connected to the water pump and the other end connected to the hydraulic turbine. As shown in FIG. 4, the apparatus includes:

- an obtaining module 401 configured to obtain a first parameter set of pumping measurement parameters for characterizing the three-machine pumped storage unit, where the first parameter set includes a gravitational acceleration, a water head, an inflow, power absorbed by a power grid, and a design efficiency of a pumped storage power station, and for details, reference is made to the related description of step 101 in the above method embodiment;
- a first determination module 402 configured to determine a pumping process efficiency based on the gravitational acceleration, the water head, the inflow, and the power absorbed by the power grid, where the pumping process efficiency is obtained when the generator, the water pump, and the hydraulic turbine in the three-machine pumped storage unit operate simultaneously, and for details, reference is made to the related description of step 102 in the above method embodiment;
- a second determination module 403 configured to determine a first relational expression based on the pumping process efficiency and the design efficiency of the pumped storage power station, where the first relational expression reflects a relationship between the pumping process efficiency and the design efficiency of the pumped storage power station, and for details, reference is made to the related description of step 103 in the above method embodiment;

an establishment module 404 configured to establish a second relational expression based on the first relational expression, where the second relational expression characterizes power of the hydraulic turbine, and for details, reference is made to the related description of step 104 in the above method embodiment;

a third determination module 405 configured to determine a third relational expression based on the power absorbed by the power grid and the second relational expression, where the third relational expression reflects a first regulation range of the power absorbed by the power grid during pumping by the three-machine pumped storage unit, and for details, reference is made to the related description of step 105 in the above method embodiment; and a fourth determination module 406 configured to determine a fourth relational expression based on the third relational expression, where the fourth relational expression reflects the regulation range of the pumping power of the three-machine pumped storage unit, and for details, reference is made to the related description of step 106 in the above method embodiment.

According to the apparatus for determining a regulation range of pumping power of a three-machine pumped storage unit provided by the embodiment of the present disclosure, the three-machine pumped storage unit includes the generator, the water pump, and the hydraulic turbine, where the main shaft of the generator has one end connected to the water pump and the other end connected to the hydraulic turbine. The method for determining the regulation range of the pumping power of the three-machine pumped storage unit is proposed according to unit characteristics and operating economy of the power station, such that the implementation of pumping hydraulic short circuit operation is taken into account in advance in a design stage, the problem that the pumping power cannot be regulated is solved, the capability of the pumped storage power station to be flexibly regulated to serve the power grid is enhanced, and a basis is provided for regulating the pumping power of the three-machine pumped storage unit during hydraulic circuit operation.

As an optional implementation of the embodiment of the present disclosure, the obtaining module includes: a first obtaining sub-module configured to obtain power of the water pump and the power of the hydraulic turbine; and a first calculation sub-module configured to calculate the power absorbed by the power grid based on the power of the water pump and the power of the hydraulic turbine.

As an optional implementation of the embodiment of the present disclosure, the obtaining module further includes: a second obtaining sub-module configured to obtain a weighted average efficiency of the water pump and a weighted average efficiency of the hydraulic turbine; a second calculation sub-module configured to calculate a flow of the water pump based on the power of the water pump, the weighted average efficiency of the water pump, the gravitational acceleration, and the water head; a third calculation sub-module configured to calculate a flow of the hydraulic turbine based on the power of the hydraulic turbine, the weighted average efficiency of the hydraulic turbine, the gravitational acceleration, and the water head; and a fourth calculation sub-module configured to calculate the inflow based on the flow of the water pump and the flow of the hydraulic turbine.

As an optional implementation of the embodiment of the present disclosure, the second determination module includes a first determination sub-module configured to determine the first relational expression based on the gravitational acceleration, the water head, the power of the water pump, the weighted average efficiency of the water pump, the power of the hydraulic turbine, the weighted average efficiency of the hydraulic turbine, and the design efficiency of the pumped storage power station.

As an optional implementation of the embodiment of the present disclosure, the establishment module includes a transformation sub-module configured to transform the first relational expression according to the first determination sub-module to obtain the second relational expression, where the second relational expression is determined based on the power of the water pump, the weighted average efficiency of the water pump, the weighted average efficiency of the hydraulic turbine, and the design efficiency of the pumped storage power station.

As an optional implementation of the embodiment of the present disclosure, the third determination module includes a second determination sub-module configured to determine the third relational expression based on the power of the water pump, the weighted average efficiency of the water pump, the weighted average efficiency of the hydraulic turbine, and the design efficiency of the pumped storage power station.

As an optional implementation of the embodiment of the present disclosure, the third determination module includes: a third determination sub-module configured to determine a fifth relational expression based on the power absorbed by the power grid, where the fifth relational expression reflects a second regulation range of the power absorbed by the power grid; and a fourth determination sub-module configured to determine the fourth relational expression based on the fifth relational expression and the third relational expression.

For details of functional description of the apparatus for determining a regulation range of pumping power of a three-machine pumped storage unit provided by the embodiment of the present disclosure, reference is made to the description of the method for determining a regulation range of pumping power of a three-machine pumped storage unit in the above embodiment.

Figure 5:
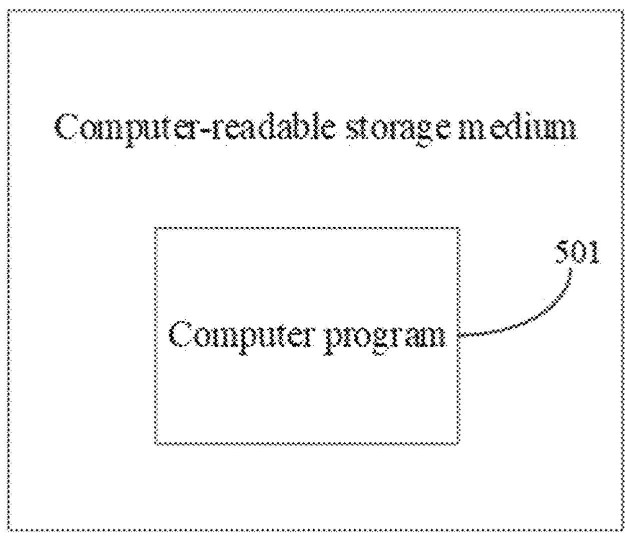
FIG. 5 is a schematic structural diagram of a computer-readable storage medium provided according to an embodiment of the present disclosure.

An embodiment of the present disclosure further provides a storage medium. As shown in FIG. 5, the storage medium has a computer program 501 stored thereon, where the computer program, when executed by a processor, implements the steps of the method for determining a regulation range of pumping power in the above embodiment. The storage medium may be a magnetic disk, a compact disc, a read-only memory (ROM), a random access memory (RAM), a flash memory, a hard disk drive (HDD), a solid-state drive (SSD), or a combination thereof.

Those skilled in the art may understand that all or some of the processes in the method of the above embodiment may be implemented by a computer program instructing relevant hardware. The program may be stored in a computer-readable storage medium, and when the program is executed, the processes of the above method embodiments may be included. The storage medium may be a magnetic disk, a compact disc, a read-only memory (ROM), a random access memory (RAM), a flash memory, a hard disk drive (HDD), a solid-state drive (SSD), or a combination thereof.

Figure 6:
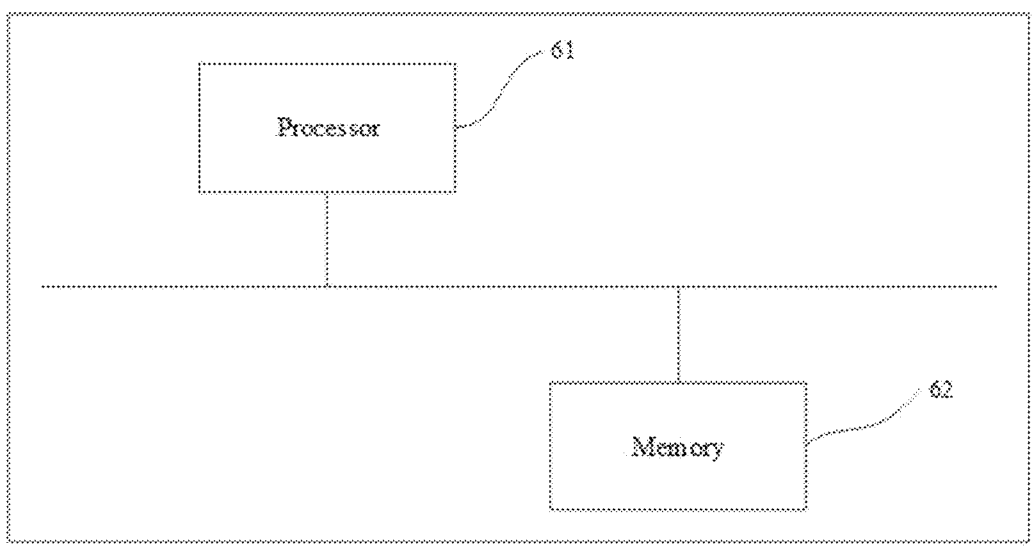
FIG. 6 is a schematic structural diagram of an electronic device provided according to an embodiment of the present disclosure.

An embodiment of the present disclosure further provides an electronic device. As shown in FIG. 6, the electronic device may include a processor 61 and a memory 62, where the processor 61 and the memory 62 may be connected by a bus or in other ways. The bus connection is used as an example in FIG. 6.

The processor 61 may be a central processing unit (CPU). The processor 61 may also be a chip such as another general processor, a digital signal processor (DSP), an application specific integrated circuit (ASIC), a field-programmable gate array (FPGA) or another programmable logic device, a discrete gate or a transistor logic device, or a discrete hardware component, or a combination thereof.

The memory 62, as a non-transient computer-readable storage medium, may be configured to store non-transient software programs, non-transient computer executable programs and modules, such as corresponding program instructions/modules in the embodiments of the present disclosure. The processor 61 executes various functional applications and data processing of the processor by running the non-transitory software programs, instructions and modules stored in the memory 62, that is, implements the method for determining a regulation range of pumping power in the above method embodiments.

The memory 62 may include a program storage area and a data storage area, where the program storage area may store an operating device and an application program required for at least one function; and the data storage area may store data and the like created by the processor 61. In addition, the memory 62 may include a high speed random access memory, and may further include a non-transitory memory, such as at least one disk storage device, a flash memory device, or other non-transitory solid state storage devices. In some embodiments, the memory 62 optionally includes a memory remotely disposed with respect to the processor 61, and these remote memories may be connected to the processor 61 through a network. Examples of the networks include, but are not limited to, the Internet, intranets, local area networks, mobile communication networks, and combinations thereof.

The one or more modules are stored in the memory 62, and perform, when executed by the processor 61, the method for determining the regulation range of the pumping power in the embodiment as shown in FIG. 1.

The specific details of the electronic device may be understood with reference to the corresponding related descriptions and effects in the embodiment shown in FIG. 1, and will not be repeated herein.

While the embodiments of the present disclosure are described with reference to the accompanying drawings, those skilled in the art may make various modifications and variations without departing from the spirit and scope of the present disclosure, all of which fall within the scope defined by the appended claims.

What is claimed is:

1. A method for regulating pumping power of a three-machine pumped storage unit, the three-machine pumped storage unit comprising a generator, a water pump, and a hydraulic turbine, a main shaft of the generator having one end connected to the water pump and other end connected to the hydraulic turbine, the method comprising:

determining an allowable regulation range of the pumping power of the three-machine pumped storage unit, wherein, obtaining a first parameter set of pumping measurement parameters for characterizing the three-machine pumped storage unit, wherein the first parameter set comprises a gravitational acceleration, a water head, an inflow, power absorbed by a power grid, and a design efficiency of a pumped storage power station;

determining a pumping process efficiency based on the gravitational acceleration, the water head, the inflow, and the power absorbed by the power grid, wherein the pumping process efficiency is obtained when the generator, the water pump, and the hydraulic turbine in the three-machine pumped storage unit operate simultaneously;

determining a first relational expression based on the pumping process efficiency and the design efficiency of the pumped storage power station, wherein the first relational expression reflects a relationship between the pumping process efficiency and the design efficiency of the pumped storage power station;

establishing a second relational expression based on the first relational expression, wherein the second relational expression characterizes power of the hydraulic turbine;

determining a third relational expression based on the power absorbed by the power grid and the second relational expression, wherein the third relational expression reflects a first regulation range of the power absorbed by the power grid during pumping by the three-machine pumped storage unit; and determining a fourth relational expression based on the third relational expression, wherein the fourth relational expression reflects the allowable regulation range of the pumping power of the three-machine pumped storage unit;

wherein, the first relational expression is $$g_H(P_p\eta_p/gH-P_t(gH\eta_t))/P_p-P_t)\geq\eta_{power\ station};$$

where $g_H(P_p\eta_p/gH-P_t(gH\eta_t))/P_p-P_t)$ represents the pumping process efficiency, $\eta_{power\ station}$ represents the design efficiency of the pumped storage power station, g represents the gravitational acceleration; H represents the water head; $P_p$ represents of a power of the water pump, $\eta_p$ represents weighted average efficiency of the water pump, $\eta_t$ represents weighted average efficiency of the hydraulic turbine;

the second relationship is $P_t\leq(P_p\eta_p-AP_p)/(1/\eta_t-\eta_{power\ station})$;

the third relational expression is $$P_m\geq P_p-(P_p\eta_p-\eta_{power\ station}P_p)/(1/\eta_t-\eta_{power\ station});$$

$P_m$ represents the first regulation range of the power absorbed by the power grid during pumping by the three-machine pumped storage unit;

the fourth relational expression is $$P_p-(P_p\eta_p-\eta_{power\ station}P_p)/(1/\eta_t-\eta_{power\ station})\leq P_m\leq P_p;$$

during pumping operation, operating the water pump and the hydraulic turbine simultaneously, opening ball valves at an upstream part of the water pump, opening ball valves of the hydraulic turbine are opened to a certain degree according to a power requirement, and regulating the pumping power of the three-machine pumped storage unit within the allowable regulation range.

2. The method according to claim 1, wherein obtaining power absorbed by a power grid in the first parameter set comprises:

obtaining power of the water pump and the power of the hydraulic turbine; and calculating the power absorbed by the power grid based on the power of the water pump and the power of the hydraulic turbine.

3. The method according to claim 2, wherein obtaining an inflow in the first parameter set comprises:

obtaining a weighted average efficiency of the water pump and a weighted average efficiency of the hydraulic turbine;

calculating a flow of the water pump based on the power of the water pump, the weighted average efficiency of the water pump, the gravitational acceleration, and the water head;

calculating a flow of the hydraulic turbine based on the power of the hydraulic turbine, the weighted average efficiency of the hydraulic turbine, the gravitational acceleration, and the water head, and calculating the inflow based on the flow of the water pump and the flow of the hydraulic turbine.

4. The method according to claim 3, wherein determining a first relational expression based on the pumping process efficiency and the design efficiency of the pumped storage power station comprises:

determining the first relational expression based on the gravitational acceleration, the water head, the power of the water pump, the weighted average efficiency of the water pump, the power of the hydraulic turbine, the weighted average efficiency of the hydraulic turbine, and the design efficiency of the pumped storage power station.

5. The method according to claim 4, wherein establishing a second relational expression based on the first relational expression comprises:

transforming the first relational expression to obtain the second relational expression, wherein the second relational expression is determined based on the power of the water pump, the weighted average efficiency of the water pump, the weighted average efficiency of the hydraulic turbine, and the design efficiency of the pumped storage power station.

6. The method according to claim 5, wherein determining a third relational expression based on the power absorbed by the power grid and the second relational expression comprises:

determining the third relational expression based on the power of the water pump, the weighted average efficiency of the water pump, the weighted average efficiency of the hydraulic turbine, and the design efficiency of the pumped storage power station.

7. The method according to claim 6, wherein determining a fourth relational expression based on the third relational expression comprises:

determining a fifth relational expression based on the power absorbed by the power grid, wherein the fifth relational expression reflects a second regulation range of the power absorbed by the power grid; and determining the fourth relational expression based on the fifth relational expression and the third relational expression.

8. An apparatus for regulating pumping power of a three-machine pumped storage unit, the three-machine pumped storage unit comprising a generator, a water pump, and a hydraulic turbine, a main shaft of the generator having one end connected to the water pump and the other end connected to the hydraulic turbine, the apparatus comprising:

a processor and a memory storing instructions that, when executed by the processor, cause the processor to perform the following steps;

determining an allowable regulation range of the pumping power of the three-machine pumped storage unit, wherein, obtaining a first parameter set of pumping measurement parameters for characterizing the three-machine pumped storage unit, wherein the first parameter set comprises a gravitational acceleration, a water head, an inflow, power absorbed by a power grid, and a design efficiency of a pumped storage power station, determining a pumping process efficiency based on the gravitational acceleration, the water head, the inflow, and the power absorbed by the power grid, wherein the pumping process efficiency is obtained when the generator, the water pump, and the hydraulic turbine in the three-machine pumped storage unit operate simultaneously, determining a first relational expression based on the pumping process efficiency and the design efficiency of the pumped storage power station, wherein the first relational expression reflects a relationship between the pumping process efficiency and the design efficiency of the pumped storage power station;

establishing a second relational expression based on the first relational expression, wherein the second relational expression characterizes power of the hydraulic turbine;

determining a third relational expression based on the power absorbed by the power grid and the second relational expression, wherein the third relational expression reflects a first regulation range of the power absorbed by the power grid during pumping by the three-machine pumped storage unit; and determining a fourth relational expression based on the third relational expression, wherein the fourth relational expression reflects the allowable regulation range of the pumping power of the three-machine pumped storage unit;

wherein, the first relational expression is $$g_H(P_p\eta_p/gH-P_t(gH\eta_t))/P_p-P_t)\geq\eta_{power\ station};$$

where $g_H(P_p\eta_p/gH-P_t(gH\eta_t))/P_p-P_t)$ represents the pumping process efficiency, $\eta_{power\ station}$ represents the design efficiency of the pumped storage power station, g represents the gravitational acceleration; H represents the water head; $P_p$ represents of a power of the water pump, $\eta_p$ represents weighted average efficiency of the water pump, $\eta_t$ represents weighted average efficiency of the hydraulic turbine;

the second relationship is $P_t\leq(P_p\eta_p-AP_p)/(1/\eta_t-\eta_{power\ station})$;

the third relational expression is $$P_m\geq P_p-(P_p\eta_p-\eta_{power\ station}P_p)/(1/\eta_t-\eta_{power\ station});$$

$P_m$ represents the first regulation range of the power absorbed by the power grid during pumping by the three-machine pumped storage unit;

the fourth relational expression is $$P_p-(P_p\eta_p-\eta_{power\ station}P_p)/(1/\eta_t-\eta_{power\ station})\leq P_m\leq P_p;$$

during pumping operation, operating the water pump and the hydraulic turbine simultaneously, opening ball valves at an upstream part of the water pump, opening ball valves of the hydraulic turbine are opened to a certain degree according to a power requirement, and regulating the pumping power of the three-machine pumped storage unit within the allowable regulation range.

* * * * *